(12) United States Patent
Portal

(10) Patent No.: US 6,495,197 B1
(45) Date of Patent: Dec. 17, 2002

(54) METHOD FOR PROVIDING METALLIZED AREAS ON SURFACE BY ELECTRICALLY DETECTING REMOVAL OF INSULATING LAYER

(75) Inventor: Fabrice Portal, Ger (FR)

(73) Assignee: Aerospatiale Matra Airbus, Paris Cedex (FR)

( * ) Notice: Subject to any disclaimer, the term of this patent is extended or adjusted under 35 U.S.C. 154(b) by 0 days.

(21) Appl. No.: 09/560,332

(22) Filed: Apr. 28, 2000

(30) Foreign Application Priority Data

Apr. 28, 1999 (FR) .............................................. 99 05563

(51) Int. Cl.[7] .................................................. B05D 3/12
(52) U.S. Cl. ............................. 427/8; 427/277; 427/356
(58) Field of Search ................................. 427/358, 277, 427/96, 356, 289, 8; 29/889.71, 889.7

(56) References Cited

U.S. PATENT DOCUMENTS 2,838,828 A  6/1958  Nordstrom
5,257,531 A  11/1993 Motosugi et al.
5,846,361 A * 12/1998 Fasano et al. ........... 156/89.16

FOREIGN PATENT DOCUMENTS

JP  9-136260  * 5/1997

* cited by examiner

*Primary Examiner*—Katherine A. Bareford
(74) *Attorney, Agent, or Firm*—Young & Thompson

(57) ABSTRACT

The process, in which there is carried out localized surface metallization of pieces of composite material, of the type covered on their surface with a layer (CC) of an electrically conductive material, itself coated with an electrically insulating protective layer (P) such as paint or the like, is characterized in that in line with each zone of said painted surface dedicated to a hole to be metallized, there is carried out a scraping off down to the conductive layer (CC), with the help of a metallic edge pressed resiliently and moved over the surface of the piece, stopping of the scraping off being controlled consecutively upon reaching or exceeding a predetermined threshold of electrical conduction between the conductive layer (CC) and the metallic edge and, finally, the various holes of the piece are pierced and shaped.

2 Claims, 3 Drawing Sheets

METHOD FOR PROVIDING METALLIZED AREAS ON SURFACE BY ELECTRICALLY DETECTING REMOVAL OF INSULATING LAYER

BACKGROUND OF THE INVENTION

1. Field of the Invention

The present invention relates to the localized surface metallization of pieces of composite material and more particularly of pieces, particularly adapted to be mounted on aircraft, constituted of a composite material covered with a layer of an electrically conductive material to protect against lightning or against too strong electric charges for example, and, of a protective coating of the surface of said metallic layer, formed by a layer of paint, of anodization, or the like.

2. Description of the Related Art

After producing by moulding, these pieces are then pierced in different locations to be able to be fixed to the place to which they are destined. Certain of the pierced points will be used as contact points for grounding.

As the pieces are painted or coated with an electrically insulating corresponding protective layer, it is necessary to free the periphery of the selected holes to expose the electrically conductive layer, this operating being called metallization. This has been done until now by a long, difficult and costly process which consists in the following steps:

- moulding the composite piece with the layer of conductive material at the surface (generally a metallic sheet of aluminum or bronze for example).
- piercing/shaping of holes with the aid of a computer-controlled machine.
- manually masking, with the aid of small sticky dots, the holes before undergoing metallization.
- painting the piece, the term "painting" here meaning, as well as in the description which follows, any protective coating covering the conductive layer of the piece.
- unmasking the holes and manually removing the dots.
- manually clearing the holes that were not masked (non-metallized holes) to open the holes filled with paint.
- manually finishing of the holes to be metallized. This last operation is delicate, long, difficult and adapted to cause defective metallization.

Thus, despite the presence of the dots, the paint leaks even under the dots, thus forming a layer of paint at the periphery of the holes to be metallized. It is thus necessary to scalp this periphery to remove any trace of paint, as well as any portion of the resin of the composite material adapted to cover the conductive layer, generally a metallic cloth which is embedded at least partially in said resin.

This exposure of the conductive layer is carried out by a worker who introduces into the bore the free end of a metallizing brush driven in rotation and strips the peripheral region of the opening of the bore. Then, visually, the worker verifies the work that has been carried out. If paint remains, he does it again. Generally, he repeats a large number of times for a same piece, with the risk of going too far, which is to say also removing pieces of the conductive layer. The integrity of this latter is thus lessened, which risks degrading the quality of the electrical contact later established for the purpose of grounding.

The risk of damaging the integrity of the conductive layer is not small, in contrast to the layer of paint which itself is very thin, the piece being moreover most often contoured, such that in the same region there can be found, in one place, some paint, and a little ways away, a portion of removed conductive layer.

Such a process thus gives rise to long production cycles and variable quality, in addition to the cost arising from the skilled work of the metallization.

So as to overcome these drawbacks, various paths have been followed, such as improvement of the metallizing brushes, the use of various assemblies of metallizing brushes, or else recourse to sanding or abrasives.

None of these techniques is a completely satisfactory solution to the problems of metallization, particularly because of the requirement for the use of visual examination by the worker and the risk, present no matter what the means used, of going too far in removing the paint.

SUMMARY OF THE INVENTION

The present invention has precisely the aim of solving these problems by providing a metallization process adapted to carry out automatically optimum metallization, which is to say with controlled exposure, if desired total exposure of the conductive layer, without impairing the physical integrity of this latter.

To this end, the invention has for an object a process for localized surface metallization of pieces of composite material, of the type covered with a surface layer of an electrically conductive material, itself coated with an electrically insulating layer, such as paint or the like, characterized in that after moulding of said piece of composite material with said conductive surface layer, all the surface of said paint or the like is coated on the conductive layer side of the piece, then, in line with each region of said surface dedicated to a hole to be metallized, there is carried out a scraping off or leveling until the conductive layer is exposed, with the help of a metal edge that is pressed resiliently and moved against the surface of the piece, the end of the scraping off being controlled consecutively upon reaching or exceeding a predetermined threshold of electrical conductivity between said conductive layer and said metallic edge and, finally, the various holes of the piece are pierced and shaped.

Such a process can be practiced by a computer-controlled machine carrying out all the steps of said process, automatically, and on pieces that can have complicated shapes, particularly irregular surfaces.

The invention also has for its object a metallizing tool particularly suited for carrying out scraping off or leveling according to the above process.

This tool, more particularly adapted to be mounted on a milling head of a multi-axle digitally-controlled machine, is constituted by a rotating spindle provided at its end with a transverse arm carrying at one end a counterweight and at its other end a tool-carrying arm articulated on said transverse arm about an axis orthogonal to the axis of the spindle, said tool-carrying arm being turned toward said axis of the spindle and carrying a plate of carbide or the like, positioned so as to form a negative cutting angle and to define a scraping edge whose one end is in line with the axis of the spindle, return means being provided between the transverse arm and the tool-carrying arm resiliently to press the plate or the like against the surface to be scraped off, said plate being electrically connected to a contact detector which itself is connected, on the one hand, to the conductive layer of the piece to be metallized by a removable connection and, on the other hand, to the digital control of the multi-axle machine, said detector comprising a current generator and controlling the stopping of said rotatable spindle when it reaches or exceeds a predetermined threshold of intensity of current flowing between the conductive layer and the plate.

Said threshold of current intensity is of course variable and depends particularly on the quality of metallization that is sought.

When the carbide plate touches the conductive material of the piece, the current passes and the intensity of this current is a good indicator of the degree of stripping of the conductive layer.

Preferably, the carbide plate is mounted on the arm oscillatingly, by an axle about which the plate can pivot so as continuously to match the surface to be scraped off, particularly when it is convex or concave.

According to one embodiment, the electrical connection between the plate and the contact detector is effected by an electrical conductor connecting the plate to a collector arranged on the rotating spindle and in contact with a brush itself connected to said detector.

Preferably, such a connection can be divided for detecting anomalies in this connection, for safety purposes.

BRIEF DESCRIPTION OF THE DRAWINGS

Other characteristics and advantages will become apparent from the description which follows of an embodiment of the metallizing tool according to the invention and its use for the process of metallizing also according to the invention, which description is given solely by way of example and with respect to the accompanying drawings, in which.

DESCRIPTION OF THE PREFERRED EMBODIMENTS

Figure 1A:
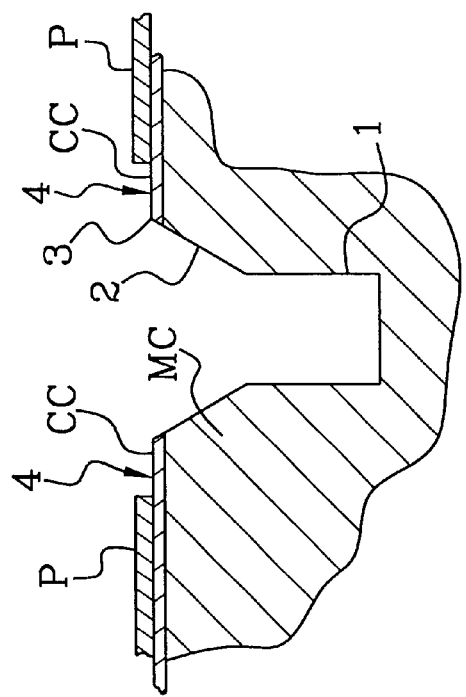
FIGS. 1a and 1b are respectively a plan view and an axial cross-sectional view of a hole to be metallized in a piece of composite material.
Figure 1B:
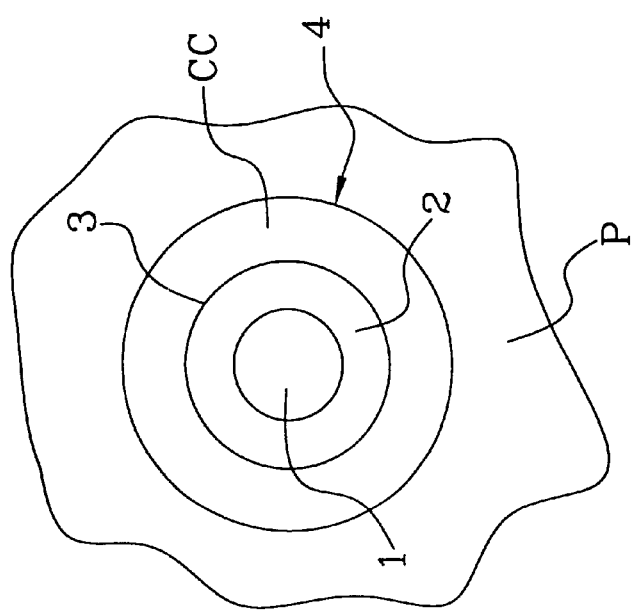

FIGS. 1a, 1b show a hole to be metallized in a piece of composite material. The structure of the piece is schematically shown in cross-section in FIG. 1b by the references MC, CC, and P, designating respectively the composite material, the conductive layer, and the protective coating. The conductive layer CC is generally a metal cloth or wire screen, for example of aluminum or bronze.

The protective coating P is a coating of paint or another protective coating such as an anodization, for example. At 1 is shown a blind cylindrical bore 1, preceded by a conical portion 2 of the circular opening 3.

The object of the metallization of the hole is to expose all about the opening 3 an annular zone 4, the conductive layer CC covering the piece. The exposed annular zone 4 will thereafter permit ensuring in line with this region 4 the electrical connection between the conductive layer CC of the piece and a metallic grounding cable, maintained in place by the securement member received in the bore 1.

The first object of the invention is a process adapted to produce automatically such a metallization under conditions particularly of maximum quality.

The process of the invention is a process for localized surface metallization, of pieces of composite material, of the type whose surface is covered with a layer of an electrically conductive material, itself coated with a protective electrically insulating layer, such as a paint or the like, characterized in that after moulding said piece of composite material with said surface conductive layer, all of the surface is covered with said paint or the like, on the conductive layer of the piece, then, in line with each zone of said surface in which a hole is to be metallized, there is produced a scraping off or leveling down to the conductive layer, with the aid of a metallic edge pressed resiliently and moved over the surface of the piece, the end of scraping off being controlled consecutively upon reaching or exceeding a predetermined threshold of electrical conduction between said conductive layer and said metallic edge and, finally, various holes are pierced and shaped in the piece.

Figure 2:
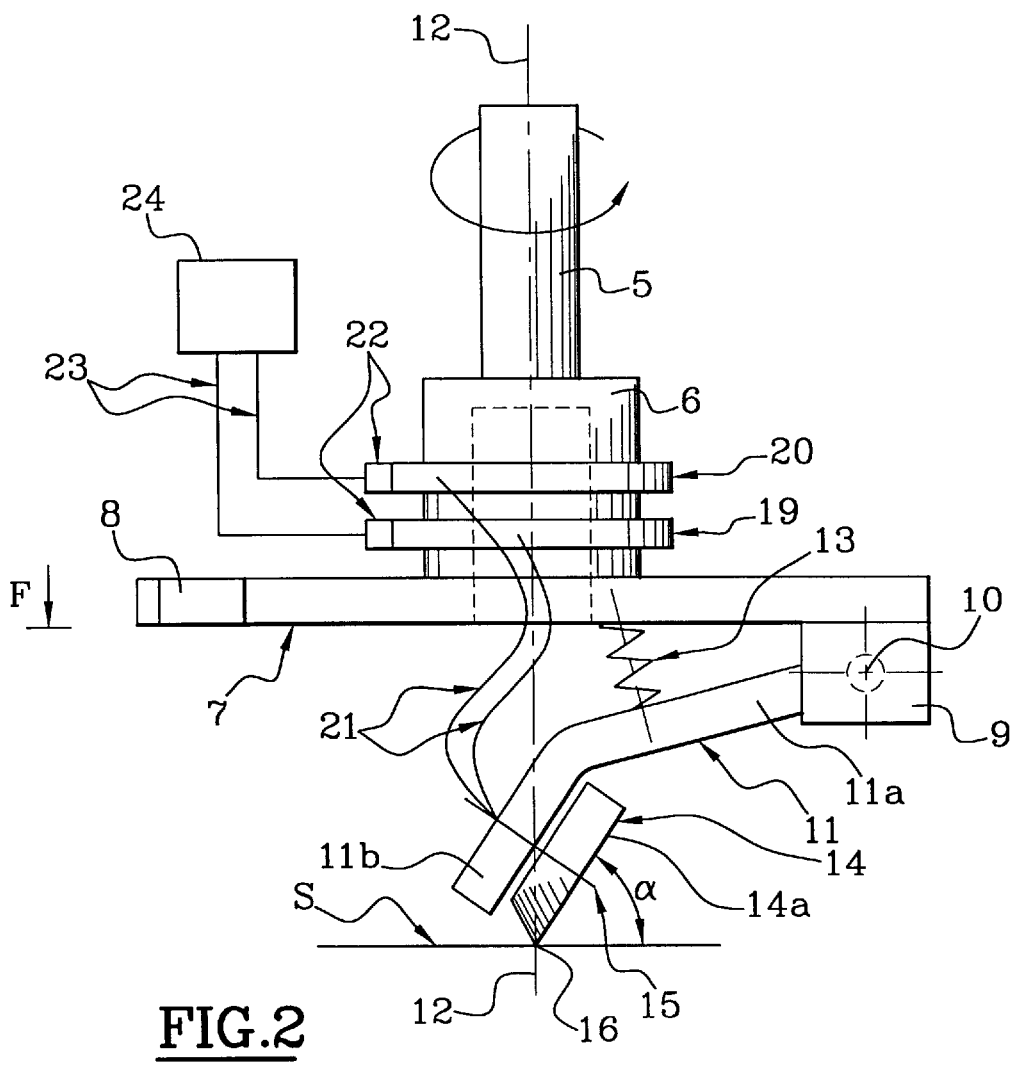
FIG. 2 is a schematic axial cross-sectional view of a metallizing tool according to the invention.
Figure 3:
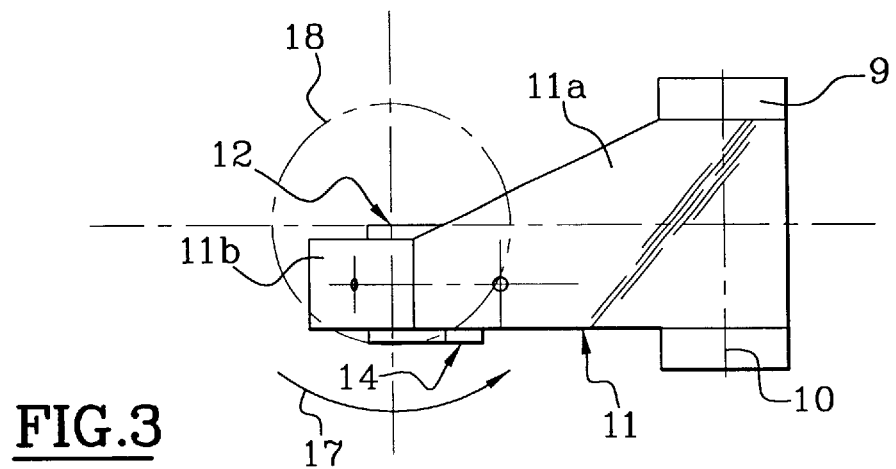
FIG. 3 is a plan view in the direction of the arrow F of the portion of the tool of FIG. 2 disposed below the transverse arm and, FIG. 4 is a schematic perspective view of a multi-axis digitally-controlled machine provided with a detector for practicing the process of the invention.

For optimum practice of this process, and according to a second object of the invention, there is provided a metallizing tool shown in FIGS. 2 and 3 in one embodiment.

The tool comprises a spindle 5 having a cylindrical section 6 of a greater diameter and at the end of which is secured a transverse arm 7.

At one of its ends, the arm 7 carries a counter-weight 8 and at its other end a plate 9 fixed to the lower surface of the arm and on which is articulated, upon an axis 10 orthogonal to the axis of the spindle 5, a tool-carrying arm 11 directed toward the axis of the spindle.

The arm 11 is slightly displaced relative to the axis of rotation 12 of the spindle 5.

In the embodiment shown in the drawings, the arm 11 comprises a first portion 11a prolonged by an elbowed portion 11b.

Between the portion 11a and the transverse arm 7 is disposed a return spring 13. On the portion 11b is secured a carbide plate 14, by means of an axle 15 permitting the plate to pivot about this axle.

The plate 14 is a conventional plate of the type used for milling.

It has a straight edge 16 which is positioned so as to touch the surface to be stripped along a segment parallel to the axis 10 and whose one end is in line with the axis 12 of the spindle 5. Moreover, the plate 14 is positioned so as to have, in the direction of rotation 17 (FIG. 3) of the tool relative to the surface (shown at S in FIG. 2) of the piece to be denuded, a negative cutting angle $\alpha$, the surface 14a of the plate being inclined forwardly relative to the direction of movement (17) of the plate.

There is shown at 18 in FIG. 3 the circular area, centered on the axis 12 of the spindle 5, for scraping or denuding the surface S by the edge 16 of the plate 14.

The spindle 5 is adapted to be mounted for example on a milling head of a digitally-controlled multi-axis machining device.

The plate 14 can thus be driven in rotation about the axis 12 while being continuously pressed in a controlled manner against the surface S by the force of the return spring 13.

Such a mounting, completed by the possibility of free movement of the plate 14 about its axis 15, permits it to follow perfectly the geometry even if complex, of the piece to be metallized and operate independently of any non-uniformity of the thickness of the layer of paint P to be scraped.

The positioning of the plate with the negative cutting angle $\alpha$ permits carrying out metallization by scraping the paint P without risk of cutting the material of the subjacent conductive layer CC.

Moreover, the enlarged section 6 of the spindle 5 carries two collectors 19 and 20 each connected to the metallic plate 14 by a conductor 21 and each associated with an electrical brush 22 connected by a conductor 23 to an ejection system 24.

Figure 4:
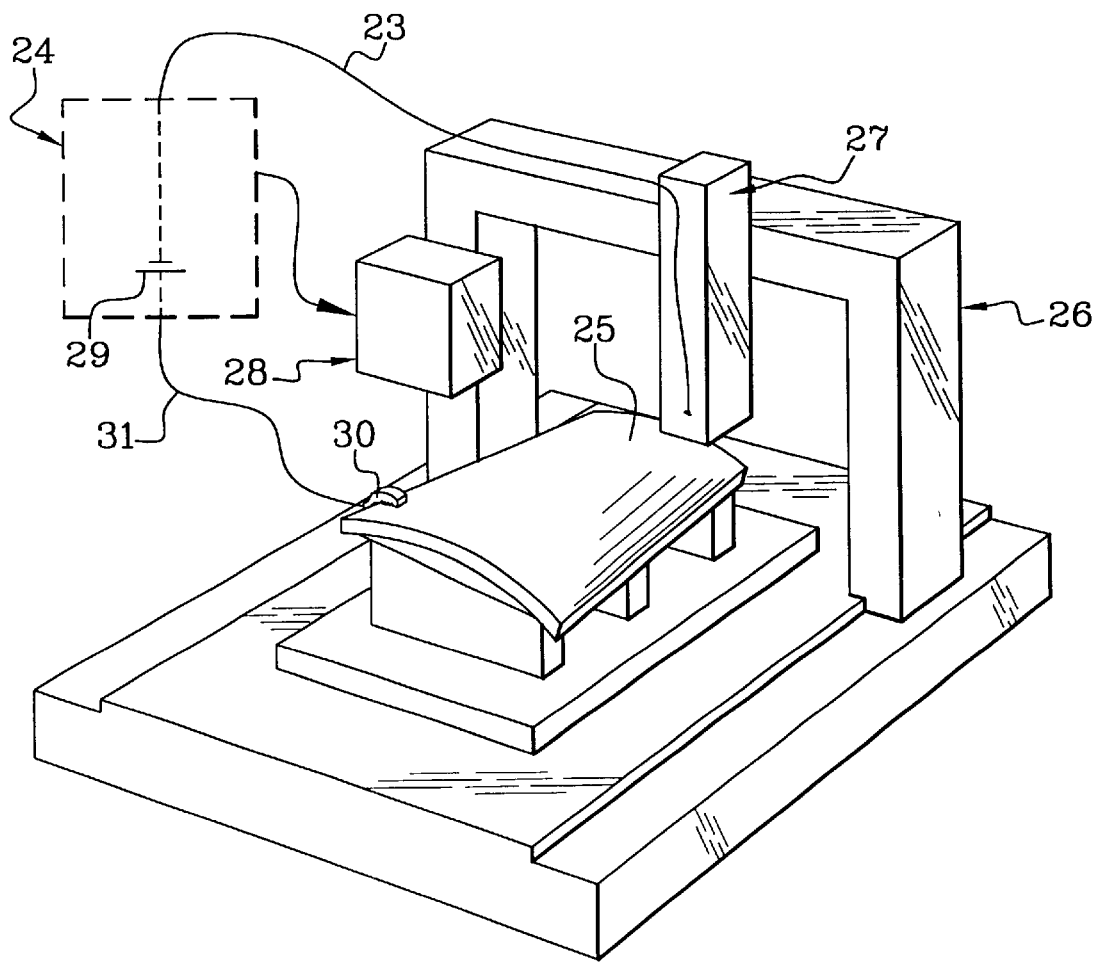

Referring now to FIG. 4, there is shown schematically a digitally-controlled multi-axis machine tool such as those used to pierce/shape pieces of composite material of the type at present in question, which is to say covered with an external conductive layer itself coated with paint or similar protection.

In FIG. 4, there is shown at 25 a piece of the above type, for example an irregularly-shaped fillet panel, disposed on the machining bench of said machine of which are shown very schematically only the machining frame 26, a tool-carrying carriage 27 movable along this frame and the digital control 28 of the machine.

On the tool-carrying head of the carriage 27 is mounted in a conventional manner the spindle 5 of the tool of FIG. 2, this spindle as well as the tool-carrying head being not shown in FIG. 4.

One of the conductors 23 is connected to a detection system 24 comprising a current generator symbolized at 29.

The detection system 24, which will be hereinafter called a detector, is also connected to the digital control 28 and the conductive layer of the panel 25 of composite material.

To this end, in a region of the painted piece 25, preferably a zone which will be a part of the scrap not used during dimensioning of the piece, there is scratched a small region of paint P to expose the subjacent conductive material CC. A clamp symbolized at 30 will be used to ensure the connection of the conductor 31 to the detector 24, with said conductive material CC.

Alternatively, the conductor 31 used as a grounding wire and can be duplicated by a control wire of this principal grounding wire 31 so as to take account of possible bad contact between the clamp 30 and the panel 25 or the cutting of said grounding wire 31.

According to the invention, before piercing/shaping of the holes (1, 2) of the panel 25, metallization is carried out in appropriate zones.

Thanks to the digital control 28, the plate 14 is brought to face each portion to be metallized of the surface S of the piece 25, the axis 12 of the spindle 5 being positioned on the place of the center of each future hole.

The plate 14 is pressed against the surface S with a pressure controlled by the digital control and the rotation of the plate about the axis 12 is commenced.

The plate 14 scrapes and levels the paint P down to the subjacent conductive layer CC in the circular zone 18 (FIG. 3).

Upon rotation of the spindle 5, the current generator 29 of the detector 24 is activated.

At the beginning of the action of the plate 14, the electrical circuit 15, 21, 19, 23, 31, 30 is as an open circuit, the current does not pass between the conductive layer CC of the panel 25 and the plate 14. On the other hand, when the plate 14 encounters the material of the conductive layer CC, the current passes. This current, collected by the detector 24, is compared to a predetermined threshold of intensity.

Thus, it is necessary in order that the metallization be sufficient, that the zone to be metallized be sufficiently denuded, without remaining paint.

The intensity of the current passing between the conductive layer CC and the plate 14 gives a good idea of the degree of stripping, because the greater the passage section will be, which is to say the denuded surface, the greater will be the current that will pass.

This intensity threshold is obviously variable and depends on the surface to be stripped and on the quality of stripping sought.

It is not desirable to use, in place of the current generator 29, a voltage generator, because, as soon as a small portion of the conductive layer is stripped away, the circuit is closed, but it is only with difficulty that the extent of the stripping can this way be detected, which inevitably reflects on the quality.

As soon as the threshold of intensity, for example several hundreds of milliamperes, is detected, the detector 24 generates a stop signal sent to the digital control 28 so as to stop the tool and the scraping.

For such an operation, only one of the two circuits 19, 21, 23 suffices. The second parallel circuit (collector 20) is optional. This is a control circuit permitting improving the safety of the tool by taking account of any defective functioning of the principal circuit (19), such as poor contact in the collector 19 due to wear or a broken electrical wire (21, 23).

For maximum security, to avoid any physical attack on the subjacent conductive layer, the tool can be stopped as soon as there is the detection of exceeding the pre-fixed threshold, which is to say without waiting until the threshold be permanently reached in the course of rotation of the tool. In this case, one can be certain that the stripped conductive layer is not attacked, even if there remains, here and there in the area 18, a zone still covered with paint, but very small due to the scraping. The elimination of these particles of paint will then be carried out manually but rapidly, in the conventional manner.

When the metallization operation carried out by the machine has been completed, there is then carried out by the digital control 28 a piercing/shaping of all the holes (1, 2) with which the panel 25 is to be provided.

The panel 25 is then if desired finished such as to its metallization, in the case in which the maximum safety procedure carried out immediately above is used.

In addition to obtaining optimum metallization, which is to say with total scraping of the paint P or the like practically without risk of physical harm to the conductive underlayer CC, the process of the invention permits by its automization substantially reducing the duration of the metallization cycle for a piece, with concomitant reduction in cost that this brings.

The speed of rotation of the tool, of the order of 600 turns per minute, for example, suffices to create an air draft evacuating the cuttings toward the exterior, by permitting avoiding any disturbance of the detection of the passage of the current between the conductive layer CC and the plate 14.

A suction system could nevertheless be provided to suck up the cuttings.

It is to be noted that the use according to the invention can be used to perform metallization on any piece of composite material, no matter what the object of these metallizations and whether the holes be pierced or not in line with the latter, the parameters of the tool being adapted for each piece.

Finally, the invention is obviously not limited to the embodiments of practice represented and described above, but on the contrary covers all variations, particularly as to dimensions, shape and arrangement of carbide plate 14 or any other metallic element suitable for performing the same results, the manner of floating and resilient mounting of the plate 14 or the like on the tool carrier (5, 6, 7) and the configuration of this latter.

What is claimed is:

1. Process for localized surface metallization of pieces of composite material having a surface covered with a conductive layer (CC) of an electrically conductive material, the conductive layer being coated with an electrically insulating protective layer (P), the process comprising the steps of:

after molding said piece of composite material with said conductive layer (CC), covering all of a surface of the conductive layer (CC) of the piece with the electrically insulating protective layer (P);

positioning a rotatable tool having a metallic edge in line with a region the piece of composite material where the conductive layer is to be exposed;

connecting a current generator to said conductive layer and to said metallic edge;

rotating the tool with the metallic edge held in resilient contact with the protective layer so as to remove the protective layer;

detecting electric current flow between the conductive layer and the metallic edge indicating contact between the conductive layer and the metallic edge;

continuing rotation of the tool beyond the indication of contact until a predetermined electrically conductive threshold of intensity of the electric current between said conductive layer (CC) and said metallic edge (16) is reached; and piercing at least one hole through an exposed area of the conductive layer.

2. A method of providing electrically conductive areas in selected locations on a material comprising the steps of:

providing a work piece comprising a composite material, a surface of the composite material having a first coating of an electrically conductive layer, the electrically conductive layer having a coating of an electrically insulating layer;

providing a rotatable scraping tool comprising a plate having a metallic edge held in resilient contact with the electrically insulating layer;

electrically connecting a current driver to the electrically conductive layer and the metallic edge of the scraping tool;

rotating the tool about an axis in a direction of movement to scrape a predetermined area of the electrically insulating layer while measuring current passing from the metallic edge to the electrically conductive layer; and stopping rotation of the tool when the measured current reaches a predetermined level;

wherein the surface of the plate is inclined forwardly relative to the direction of movement during the scraping step.

* * * * *